United States Patent
Murata et al.

(10) Patent No.: US 8,835,007 B2
(45) Date of Patent: Sep. 16, 2014

(54) TEMPERED GLASS AND TEMPERED GLASS SHEET

(75) Inventors: Takashi Murata, Shiga (JP); Takako Tojyo, Shiga (JP); Kosuke Kawamoto, Shiga (JP); Yuusuke Tomita, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 13/569,633

(22) Filed: Aug. 8, 2012

(65) Prior Publication Data

US 2013/0017380 A1  Jan. 17, 2013

Related U.S. Application Data

(63) Continuation-in-part of application No. 13/351,601, filed on Jan. 17, 2012.

(60) Provisional application No. 61/434,033, filed on Jan. 19, 2011.

(51) Int. Cl.

| B32B 17/06 | (2006.01) |
| C03C 3/085 | (2006.01) |
| C03C 3/087 | (2006.01) |
| C03B 25/08 | (2006.01) |
| C03C 3/062 | (2006.01) |
| C03C 21/00 | (2006.01) |

(52) U.S. Cl.
CPC ............... *C03C 3/085* (2013.01); *C03C 3/087* (2013.01); *C03B 25/08* (2013.01); *C03C 3/062* (2013.01); *C03C 21/002* (2013.01)
USPC ........... 428/410; 428/409; 428/688; 428/689; 428/702; 428/426

(58) Field of Classification Search
CPC ............ C03C 3/00; C03C 3/04; C03C 3/076; C03C 3/083; C03C 3/085; C03C 15/00; C03C 21/00; C03C 21/001; C03C 21/002; C03C 2204/08; C03C 2203/00; B32B 17/00; B32B 17/06; B32B 33/00; B32B 2255/00; B32B 2255/20; B32B 2457/20; B32B 2457/208
USPC .......... 428/410, 701, 702, 409, 688, 689, 426
See application file for complete search history.

(56) References Cited

U.S. PATENT DOCUMENTS

| 4,015,045 A * | 3/1977 | Rinehart ...................... 428/410 |
| 2003/0109202 A1* | 6/2003 | Matsuno et al. ................ 451/41 |
| 2003/0220183 A1* | 11/2003 | Kurachi et al. ................ 501/70 |
| 2006/0063009 A1 | 3/2006 | Naitou et al. |
| 2008/0286548 A1* | 11/2008 | Ellison et al. ................ 428/220 |
| 2010/0119846 A1* | 5/2010 | Sawada ........................ 428/426 |
| 2011/0274916 A1 | 11/2011 | Murata |

FOREIGN PATENT DOCUMENTS

| JP | 2006-83045 | 3/2006 |
| JP | 2010-059038 | 3/2010 |
| JP | 2010-168233 | 8/2010 |
| WO | WO2008108332 | * 9/2008 |

OTHER PUBLICATIONS

International Search Report issued Apr. 10, 2012 in International (PCT) Application No. PCT/JP2012/050559.
Tetsuro Izumitani et al., "New Glass and Physical Properties Thereof", First Edition, Management System Laboratory, Co., Ltd., Aug. 20, 1984, pp. 451-498 with partial translation.

* cited by examiner

*Primary Examiner* — David Sample
*Assistant Examiner* — Lauren Colgan
(74) *Attorney, Agent, or Firm* — Wenderoth, Lind & Ponack, L.L.P.

(57) ABSTRACT

A tempered glass has a compression stress layer in a surface thereof, and includes as a glass composition in terms of mol %, 50 to 75% of $SiO_2$, 3 to 13% of $Al_2O_3$, 0 to 1.5% of $B_2O_3$, 0 to 4% of $Li_2O$, 7 to 20 % of $Na_2O$, 0 to 10 % of $K_2O$, 0.5 to 13% of MgO, 0 to 6% of CaO, and 0 to 4.5% of SrO. The tempered glass is substantially free of $As_2O_3$, $Sb_2O_3$, PbO, and F. The tempered glass has a molar ratio $MgO/(MgO+Al_2O_3)$ of 0.05 to 0.30.

22 Claims, No Drawings

TEMPERED GLASS AND TEMPERED GLASS SHEET

CROSS-REFERENCE TO RELATED APPLICATIONS

The present application is a continuation-in-part of U.S. application Ser. No. 13/351,601, filed on Jan. 17, 2012, which claims the benefit of U.S. Provisional Application Ser. No. 61/434,033, filed on Jan. 19, 2011, the contents of which are incorporated herein by reference.

TECHNICAL FIELD

The present invention relates to a tempered glass and a tempered glass sheet, and more particularly, to a tempered glass and a tempered glass sheet suitable for a cover glass for a cellular phone, a digital camera, a personal digital assistant (PDA), or a solar battery, or a glass substrate for a display, in particular, a touch panel display.

BACKGROUND ART

Devices such as a cellular phone, a digital camera, a PDA, a touch panel display, a large-screen television, and wireless lighting show a tendency of further prevalence.

A tempered glass, which is produced by applying tempering treatment to glass through ion exchange treatment or the like, is used for those applications (see Patent Literature 1 and Non Patent Literature 1).

The tempered glass has been particularly used in recent years for a protective member for a display of a large-screen television. Such protective member is required to have, for example, the following properties: (1) having high mechanical strength; (2) having a liquidus viscosity suitable for a down-draw method such as an overflow down-draw method or a slit down-draw method, a float method, and the like, in order to form a large number of large glass sheets; (3) having a high temperature viscosity suitable for shape formation; and (4) being able to be produced by carrying out tempering treatment inexpensively and efficiently.

CITATION LIST

Patent Literature

Patent Literature 1: JP 2006-83045 A

Non Patent Literature

Non Patent Literature 1: Tetsuro Izumitani et al., "New glass and physical properties thereof," First edition, Management System Laboratory. Co., Ltd., Aug. 20, 1984, p. 451-498

SUMMARY OF INVENTION

Technical Problem

In order to enhance the mechanical strength of a tempered glass, it is necessary to increase the compression stress value of a compression stress layer. Components such as $Al_2O_3$ are known as components capable of increasing the compression stress value. However, when the content of $Al_2O_3$ is too large, devitrification resistance lowers, with the result that it is difficult for the glass to have a liquidus viscosity suitable for a down-draw method such as an overflow down-draw method or a slit down-draw method, a float method, and the like, and moreover, the high temperature viscosity increases, with the result that it is difficult for the glass to have a forming temperature suitable for a float method or the like.

Further, through the use of a $KNO_3$ molten salt, it is possible to apply ion exchange treatment to a large number of large glass sheets continuously. However, the use of the $KNO_3$ molten salt involves a problem in that the $KNO_3$ molten salt degrades time-dependently and the degraded $KNO_3$ molten salt needs to be exchanged for a fresh one frequently. The exchange of the $KNO_3$ molten salt bath takes a long time and high cost, and hence the efficiency of ion exchange treatment reduces and the production cost of the tempered glass is liable to increase sharply.

In addition, when tempering treatment is applied to a large glass sheet, there arises a problem in that warpage of the resultant tempered glass occurs owing to a difference between the properties of the front and back surfaces (surfaces opposite to each other) of the glass sheet. Moreover, in this case, there arises a problem in that the glass sheet temporarily warps owing to a residual stress in a planar direction when the tempering treatment is performed, which causes warpage of the resultant tempered glass. In recent years, it has been required to produce a tempered glass sheet having a reduced thickness, but in this case, the problems are particularly remarkable.

Thus, a technical object of the present invention is to invent a tempered glass and a tempered glass sheet, each of which not only has high ion exchange performance and high devitrification resistance and has resistance to degradation of a $KNO_3$ molten salt, but also hardly warps even when produced by applying tempering treatment to a large glass sheet.

Solution to Problem

The inventors of the present invention have made various studies and have consequently found that the technical object can be achieved by strictly controlling the glass composition. Thus, the finding is proposed as the present invention. That is, a tempered glass of the present invention has a compression stress layer in a surface thereof, comprises, as a glass composition in terms of mol %, 50 to 75% of $SiO_2$, 3 to 13% of $Al_2O_3$, 0 to 1.5% of $B_2O_3$, 0 to 4% of $Li_2O$, 7 to 20% of $Na_2O$, 0 to 10% (preferably 0.5 to 10%) of $K_2O$, 0.5 to 13% of $MgO$, 0 to 6% of $CaO$, and 0 to 4.5% of $SrO$, and is substantially free of $As_2O_3$, $Sb_2O_3$, $PbO$, and $F$. Herein, the gist of the phrase "substantially free of $As_2O_3$" resides in that $As_2O_3$ is not added positively as a glass component, but contamination with $As_2O_3$ as an impurity is allowable. Specifically, the phrase means that the content of $As_2O_3$ is less than 0.05 mol %. The gist of the phrase "substantially free of $Sb_2O_3$" resides in that $Sb_2O_3$ is not added positively as a glass component, but contamination with $Sb_2O_3$ as an impurity is allowable. Specifically, the phrase means that the content of $Sb_2O_3$ is less than 0.05 mol %. The gist of the phrase "substantially free of PbO" resides in that PbO is not added positively as a glass component, but contamination with PbO as an impurity is allowable. Specifically, the phrase means that the content of PbO is less than 0.05 mol %. The gist of the phrase "substantially free of F" resides in that F is not added positively as a glass component, but contamination with F as an impurity is allowable. Specifically, the phrase means that the content of F is less than 0.05 mol %.

The inventors of the present invention have conducted various studies and have consequently obtained the following finding. The simultaneous control of the contents (or content ratios) of $Al_2O_3$ and MgO can enhance the ion exchange performance and devitrification resistance. The simultaneous control of the contents (or content ratios) of $Al_2O_3$ and alkali metal oxides can enhance the devitrification resistance. The addition of a predetermined amount of $K_2O$ can increase the thickness of the compression stress layer. The simultaneous control of the contents (or content ratios) of $K_2O$ and $Na_2O$ can increase the thickness of the compression stress layer without decreasing the compression stress value of the compression stress layer.

Further, when the glass composition is controlled in the above-mentioned range, the compression stress value and thickness of the compression stress layer do not extremely lower even in the case of using a degraded $KNO_3$ molten salt, and hence the frequency of exchanging a $KNO_3$ molten salt can be reduced.

Second, the tempered glass of the present invention preferably comprises, as a glass composition in terms of mol %, 50 to 75% of $SiO_2$, 4 to 13% of $Al_2O_3$, 0 to 1.5% of $B_2O_3$, 0 to 2% of $Li_2O$, 9 to 18% of $Na_2O$, 1 to 8% of $K_2O$, 0.5 to 12% of MgO, 0 to 3.5% of CaO, 0 to 3% of SrO, and 0 to 0.5% of $TiO_2$.

Third, the tempered glass of the present invention preferably comprises, as a glass composition in terms of mol %, 50 to 75% of $SiO_2$, 4 to 12% of $Al_2O_3$, 0 to 1% of $B_2O_3$, 0 to 1% of $Li_2O$, 10 to 17% of $Na_2O$, 2 to 7% of $K_2O$, 1.5 to 12% of MgO, 0 to 3% of CaO, 0 to 1% of SrO, and 0 to 0.5% of $TiO_2$.

Fourth, the tempered glass of the present invention preferably comprises, as a glass composition in terms of mol %, 55 to 75% of $SiO_2$, 4 to 11% of $Al_2O_3$, 0 to 1% of $B_2O_3$, 0 to 1% of $Li_2O$, 10 to 16% of $Na_2O$, 2 to 7% of $K_2O$, 3 to 12% of MgO, 0 to 3% of CaO, 0 to 1% of SrO, 0.5 to 10% of $ZrO_2$, and 0 to 0.5% of $TiO_2$.

Fifth, the tempered glass of the present invention preferably comprises, as a glass composition in terms of mol %, 55 to 69% of $SiO_2$, 4 to 11% of $Al_2O_3$, 0 to 1% of $B_2O_3$, 0 to 1% of $Li_2O$, 11 to 16% of $Na_2O$, 2 to 7% of $K_2O$, 3 to 9% of MgO, 0 to 3% of CaO, 0 to 1% of SrO, 1 to 9% of $ZrO_2$, and 0 to 0.1% of $TiO_2$.

Sixth, in the tempered glass of the present invention, it is preferred that a compression stress value of the compression stress layer be 300 MPa or more, and a thickness (depth) of the compression stress layer be 10 μm or more. Herein, the phrase "compression stress value of the compression stress layer" and the phrase "thickness of the compression stress layer" refer to values which are calculated from the number of interference fringes on a sample and each interval between the interference fringes, the interference fringes being observed when a surface stress meter (such as FSM-6000 manufactured by Toshiba Corporation) is used to observe the sample.

Seventh, the tempered glass of the present invention preferably has a degradation coefficient D of 0.01 to 0.6. Herein, the degradation coefficient D refers to a value calculated on the basis of the expression (compression stress value (fresh $KNO_3$ molten salt)—compression stress value (degraded $KNO_3$ molten salt))/compression stress value (fresh $KNO_3$ molten salt). Herein, the phrase "degraded $KNO_3$ molten salt" refers to a $KNO_3$ molten salt which contains $Na_2O$ at about 1,500 ppm and contains $Li_2O$ at about 20 ppm, and can be produced, for example, by the following method. First, glass containing, as a glass composition, 58.7 mass % of $SiO_2$, 12.8 mass % of $Al_2O_3$, 0.1 mass % of $Li_2O$, 14.0 mass % of $Na_2O$, 6.3 mass % of $K_2O$, 2.0 mass % of MgO, 2.0 mass % of CaO, and 4.1 mass % of $ZrO_2$ is smashed, and the smashed glass is then subjected to sieving treatment so as to collect glass powder which passes through a sieve having a sieve opening of 300 μm and does not pass through a sieve having a sieve opening of 150 μm, thereby yielding glass powder having an average particle diameter of 225 μm. Next, 95 g of the glass powder is put in a basket made by using a metal mesh having a sieve opening of 100 μm, followed by the immersion of the glass powder for 60 hours in 400 ml of $KNO_3$ kept at 440° C. (the basket is shaken up and down 10 times every 24 hours). On the other hand, the phrase "fresh $KNO_3$ molten salt" refers to a $KNO_3$ molten salt which has not ever been used for ion exchange treatment and a $KNO_3$ molten salt which contains $Na_2O$ at 200 ppm or less and contains $Li_2O$ at 3 ppm or less.

Eighth, the tempered glass of the present invention preferably has a liquidus temperature of 1,075° C. or less. Herein, the phrase "liquidus temperature" refers to a temperature at which crystals of glass are deposited after glass powder that passes through a standard 30-mesh sieve (sieve opening: 500 μm) and remains on a 50-mesh sieve (sieve opening: 300 μm) is placed in a platinum boat and then kept for 24 hours in a gradient heating furnace.

Ninth, the tempered glass of the present invention preferably has a liquidus viscosity of $10^{4.0}$ dPa·s or more. Herein, the phrase "liquidus viscosity" refers to a value obtained through measurement of a viscosity of glass at the liquidus temperature by a platinum sphere pull up method.

Tenth, the tempered glass of the present invention preferably has a temperature at $10^{4.0}$ dPa·s of 1,250 ° C. or less. Herein, the phrase "temperature at $10^{4.0}$ dPa·s" refers to a value obtained through measurement by a platinum sphere pull up method.

Eleventh, the tempered glass of the present invention preferably has a density of 2.6 g/cm³ or less. Herein, the "density" may be measured by a known Archimedes method.

Twelfth, the tempered glass of the present invention preferably has a Young's modulus of 65 GPa or more. Herein, the "Young's modulus" may be measured by a well-known resonance method or the like.

Thirteenth, a tempered glass sheet of the present invention comprises the tempered glass according to any one of the exemplary embodiments.

Fourteenth, the tempered glass sheet of the present invention is preferably formed by a float method.

Fifteenth, the tempered glass sheet of the present invention preferably has a surface formed by polishing by 0.5 μm or more in a thickness direction.

Sixteenth, the tempered glass sheet of the present invention preferably has a ΔCS value of 50 MPa or less, the ΔCS value being a difference in compression stress value of compression stress layers in surfaces opposite to each other. When the glass sheet is formed by using a float method, there occurs a difference in compression stress value between compression stress layers to be formed in a surface, which is brought into contact with molten tin, and a surface, which is not brought into contact with molten tin, even when the same ion exchange treatment is performed. As a result, warpage is liable to occur particularly in a large and thin tempered glass sheet. Thus, when the ΔCS value is controlled in the above-mentioned range, such defect can be easily prevented.

Seventeenth, a tempered glass sheet of the present invention has a compression stress in a surface thereof, has a length of 500 mm or more, a width of 500 mm or more, a thickness of 0.5 to 1.5 mm, a Young' s modulus of 65 GPa or more, a compression stress value of a compression stress layer of 200 MPa or more, a thickness of a compression stress layer of 20 μm or more, a degradation coefficient D of 0.6 or less, and a ΔCS value of 50 MPa or less, the ΔCS value being a difference in compression stress value between compression stress layers in surfaces opposite to each other.

Eighteenth, the tempered glass sheet of the present invention is preferably used for a touch panel display.

Nineteenth, the tempered glass sheet of the present invention is preferably used for a cover glass for a cellular phone.

Twentieth, the tempered glass sheet of the present invention is preferably used for a cover glass for a solar battery.

Twenty-first, the tempered glass sheet of the present invention is preferably used for a protective member for a display.

Twenty-second, a tempered glass sheet of the present invention has a compression stress in a surface thereof, comprises, as a glass composition in terms of mol %, 50 to 75% of $SiO_2$, 4 to 12% of $Al_2O_3$, 0 to 1% of $B_2O_3$, 0 to 1% of $Li_2O$, 10 to 17% of $Na_2O$, 0 to 7% (preferably 2 to 7%) of $K_2O$, 1.5 to 12% of MgO, 0 to 3% of CaO, 0 to 1% of SrO, and 0 to 0.5% of $TiO_2$, and has a molar ratio MgO/(MgO+CaO) of 0.5 or more, a length of 500 mm or more, a width of 500 mm or more, a thickness of 0.5 to 1.5 mm, a Young's modulus of 65 GPa or more, a compression stress value of a compression stress layer of 400 MPa or more, a thickness of a compression stress layer of 30 μm or more, and a degradation coefficient D of 0.4 or less.

Twenty-third, a glass to be tempered of the present invention is subjected to tempering treatment, comprises, as a glass composition in terms of mol %, 50 to 75% of $SiO_2$, 3 to 13% of $Al_2O_3$, 0 to 1.5% of $B_2O_3$, 0 to 4% of $Li_2O$, 7 to 20% of $Na_2O$, 0 to 10% (preferably 0.5 to 10%) of $K_2O$, 0.5 to 13% of MgO, 0 to 6% of CaO, and 0 to 4.5% of SrO, and is substantially free of $As_2O_3$, $Sb_2O_3$, PbO, and F.

Twenty-fourth, a glass sheet to be tempered of the present invention comprises a glass to be tempered to be subjected to tempering treatment, has a thickness of 1.5 mm or less, and has an Fmax value of 5 MPa or less, the Fmax value being the maximum value of residual stresses in a planar direction with respect to all planar portions of the glass to be tempered. Herein, the term "Fmax value" refers to the maximum value of values obtained by measuring birefringence values (unit: nm) of a glass sheet having a size of 500 mm by 500 mm or more (in particular, a size of 1 m by 1 m) at each position at which virtual grid lines with 10 cm pitch cross to each other and at the vicinities of the outer peripheral portions of its four sides by using a birefringence measuring device ABR-10A manufactured by Uniopt Corporation, Ltd., and converting the birefringence values to residual stresses in a planar direction. Further, it is possible to estimate a residual stress value in a glass sheet by optical birefringence measurement, that is, optical path difference measurement of linearly polarized waves which are mutually perpendicular. A deviatoric stress F (MPa) produced by a residual stress is expressed by the equation F=R/CL. Note that "R" represents an optical path difference (nm), "L" represents a traveling distance (cm) of a polarized wave, and "C" represents a photoelastic constant (proportional constant), which is usually a value of 20 to 40 (nm/cm)/(MPa). Note that the residual stress in the planar direction includes a tensile stress and a compression stress, and absolute values of both the stresses are evaluated in the above.

Advantageous Effects of Invention

The tempered glass of the present invention has high ion exchange performance, and hence, even when ion exchange treatment is performed for a short period of time, the compression stress value of the compression stress layer is increased and the compression stress value is formed deeply. Thus, an increased mechanical strength and a reduced variation in mechanical strength can be achieved.

Further, the tempered glass of the present invention is excellent in devitrification resistance, and hence can be formed efficiently by an overflow down-draw method, a float method, or the like. Note that a large number of large and thin glass sheets can be formed by an overflow down-draw method, a float method, or the like.

Moreover, the tempered glass of the present invention has a small degradation coefficient D, and hence, even when ion exchange treatment is performed over a long period of time, the compression stress value and thickness of the compression stress layer to be formed do not easily lower. As a result, it is possible to reduce the frequency of exchanging a $KNO_3$ molten salt.

DESCRIPTION OF EMBODIMENTS

A tempered glass according to an embodiment of the present invention has a compression stress layer in a surface thereof, comprises, as a glass composition in terms of mol %, 50 to 75% of $SiO_2$, 3 to 13% of $Al_2O_3$, 0 to 1.5% of $B_2O_3$, 0 to 4% of $Li_2O$, 7 to 20% of $Na_2O$, 0 to 10% of $K_2O$, 0.5 to 13% of MgO, 0 to 6% of CaO, and 0 to 4.5% of SrO, and is substantially free of $As_2O_3$, $Sb_2O_3$, PbO, and F. Note that the expression "%" refers to "mol %" in the following description of the content range of each component unless otherwise specified.

A method of forming the compression stress layer in the surface includes a physical tempering method and a chemical tempering method. The tempered glass of the present invention is preferably produced by a chemical tempering method.

The chemical tempering method is a method involving introducing alkali ions each having a large ion radius into the surface of glass by ion exchange treatment at a temperature equal to or lower than a strain point of the glass. When the chemical tempering method is used to form a compression stress layer, the compression stress layer can be properly formed even in the case where the thickness of the glass is small. In addition, even when a tempered glass is cut after the formation of the compression stress layer, the tempered glass does not easily break unlike a tempered glass produced by applying a physical tempering method such as an air cooling tempering method.

The reasons why the content range of each component in the tempered glass according to this embodiment is controlled in the above-mentioned range are described below.

$SiO_2$ is a component that forms a network of glass, and the content of $SiO_2$ is 50 to 75%, preferably 55 to 75%, 55 to 72%, 55 to 69%, particularly preferably 58 to 67%. When the content of $SiO_2$ is too small in glass, vitrification does not occur easily, the thermal expansion coefficient becomes too high, the thermal shock resistance easily lowers, and the degradation coefficient D is liable to increase. On the other hand, when the content of $SiO_2$ is too large in glass, the meltability and formability are liable to lower, and the thermal expansion coefficient becomes too low, with the result that it becomes difficult to match the thermal expansion coefficient with those of peripheral materials.

$Al_2O_3$ is a component that enhances the ion exchange performance of glass and a component that has the greatest effect of reducing the degradation coefficient D. $Al_2O_3$ is also a component that enhances the strain point or Young's modulus. The content of $Al_2O_3$ is 3 to 13%. When the content of $Al_2O_3$ is too small in glass, the degradation coefficient D tends to increase, and the ion exchange performance may not be exerted sufficiently. Thus, the lower limit range of $Al_2O_3$ is suitably 4% or more, 4.5% or more, 5% or more, 5.5% or more, 6% or more, 7% or more, 8.5% or more, 10% or more, particularly suitably 10.5% or more. On the other hand, when the content of $Al_2O_3$ is too large in glass, devitrified crystals are easily deposited in the glass, and it becomes difficult to form a glass sheet by a float method, an overflow down-draw method, or the like. Further, the thermal expansion coefficient of the glass becomes too low, and it becomes difficult to match the thermal expansion coefficient with those of peripheral materials. In addition, the high temperature viscosity of the glass increases and the meltability easily lowers. Thus, the upper limit range of $Al_2O_3$ is suitably 12.5% or less, particularly suitably 12% or less.

$B_2O_3$ is a component that lowers the high temperature viscosity and density of glass, stabilizes glass for a crystal to be unlikely precipitated, and lowers the liquidus temperature of glass. However, when the content of $B_2O_3$ is too large, through ion exchange, coloring on the surface of glass called weathering may occur, water resistance may lower, and the depth of a compression stress layer is liable to decrease. Thus, the content of $B_2O_3$ is 0 to 1.5%, preferably 0 to 1.3%, 0 to 1.1%, 0 to 1%, 0 to 0.8%, 0 to 0.5%, particularly preferably 0 to 0.1%.

$Li_2O$ is an ion exchange component and is a component that lowers the high temperature viscosity of glass to increase the meltability and the formability, and increases the Young's modulus. Further, $Li_2O$ has a great effect of increasing the compression stress value of glass among alkali metal oxides, but when the content of $Li_2O$ becomes extremely large in a glass system containing $Na_2O$ at 7% or more, the compression stress value tends to lower to the worse. Further, when the content of $Li_2O$ is too large in glass, the liquidus viscosity lowers, easily resulting in the devitrification of the glass, and the thermal expansion coefficient becomes too high, with the result that the thermal shock resistance lowers and it becomes difficult to match the thermal expansion coefficient with those of peripheral materials. In addition, the low temperature viscosity of the glass becomes too low, and the stress relaxation occurs easily, with the result that the compression stress value lowers to the worse in some cases. Moreover, the degradation coefficient D tends to become larger. Thus, the content of $Li_2O$ is 0 to 4%, preferably 0 to 2.5%, 0 to 2%, 0 to 1.5%, 0 to 1%, 0 to 0.5%, particularly preferably 0 to 0.3%.

$Na_2O$ is an ion exchange component and is a component that lowers the high temperature viscosity of glass to increase the meltability and formability. $Na_2O$ is also a component that improves the devitrification resistance of glass. When the content of $Na_2O$ is too small in glass, the meltability lowers, the thermal expansion coefficient lowers, and the ion exchange performance is liable to lower. Thus, the content of $Na_2O$ is 7% or more, and the lower limit range of the content of $Na_2O$ is suitably 8% or more, 9% or more, 10% or more, 11% or more, 12% or more, particularly suitably 13% or more. On the other hand, when the content of $Na_2O$ is too large in glass, the thermal expansion coefficient becomes too large, the thermal shock resistance lowers, and it becomes difficult to match the thermal expansion coefficient with those of peripheral materials. Further, the strain point lowers excessively, and the glass composition loses its component balance, with the result that the devitrification resistance lowers to the worse in some cases. Moreover, the degradation coefficient D tends to increase. Thus, the content of $Na_2O$ is 20% or less, and the upper limit range of the content of $Na_2O$ is suitably 19% or less, 17% or less, particularly suitably 16% or less.

$K_2O$ is a component that promotes ion exchange and allows the thickness of a compression stress layer to be easily enlarged among alkali metal oxides. $K_2O$ is also a component that lowers the high temperature viscosity of glass to increase the meltability and formability. $K_2O$ is also a component that improves devitrification resistance. Thus, the content of $K_2O$ is 0% or more and the lower limit range thereof is suitably 1% or more, 1.5% or more, particularly suitably 2% or more. However, when the content of $K_2O$ is too large, the thermal expansion coefficient of glass becomes too large, the thermal shock resistance of the glass lowers, and it becomes difficult to match the thermal expansion coefficient with those of peripheral materials. Further, the strain point lowers excessively, and the glass composition loses its component balance, with the result that the devitrification resistance tends to lower to the worse. Thus, the content of $K_2O$ is 10% or less and the upper limit range thereof is suitably 9% or less, 8% or less, or 7% or less, particularly suitably 6% or less.

The content of $Li_2O+Na_2O+K_2O$ is suitably 10 to 25%, 13 to 22%, 15 to 20%, 16 to 20%, 16.5 to 20%, particularly suitably 18 to 20%. When the content of $Li_2O+Na_2O+K_2O$ is too small in glass, the ion exchange performance and meltability are liable to lower. On the other hand, when the content of $Li_2O+Na_2O+K_2O$ is too large in glass, the degradation coefficient D becomes too large, the devitrification of the glass easily occurs, and the thermal expansion coefficient becomes too high, with the result that the thermal shock resistance lowers and it becomes difficult to match the thermal expansion coefficient with those of peripheral materials. In addition, the strain point of the glass lowers excessively, with the result that a high compression stress value is hardly achieved in some cases. Moreover, the viscosity at around the liquidus temperature of the glass lowers, with the result that a high liquidus viscosity is hardly secured in some cases. Note that the "$Li_2O+Na_2O+K_2O$" is the total content of $Li_2O$, $Na_2O$, and $K_2O$.

There are described reasons why the content of $Li_2O+Na_2O+K_2O$ influences the degradation coefficient D in the glass composition system according to this embodiment. In this embodiment, the content of $Li_2O$ is controlled to 4% or less, and hence a compression stress layer is formed in a surface of glass mainly through the ion exchange between Na ions and K ions. When the content of $Li_2O+Na_2O+K_2O$ becomes smaller, the contents of components which undergo ion exchange become smaller, resulting in a smaller compression stress value. In contrast, when the content of $Li_2O+Na_2O+K_2O$ is too large, the ion exchange between Na ions and K ions (formation of a compression stress layer) is promoted, and at the same time, the ion exchange between Li ions and Na ions contained in $KNO_3$ easily occurs in preference to the ion exchange between Na ions and K ions. The ion exchange between Li ions and Na ions is estimated to lead to the formation of a tensile stress, resulting in the reduction of the compression stress value of the compression stress layer.

The molar ratio $(Li_2O+Na_2O+K_2O)/Al_2O_3$ suitably falls within the range of 1 to 3. When the molar ratio $(Li_2O+Na_2O+K_2O)/Al_2O_3$ is too large in glass, the strain point lowers, the ion exchange performance is liable to lower to the worse, and the glass composition loses its component balance, with the result that the devitrification resistance is liable to lower. Moreover, the degradation coefficient D may increase. However, when the molar ratio $(Li_2O+Na_2O+K_2O)/Al_2O_3$ is too small in glass, the viscosity of the glass becomes too high, resulting in the deterioration of bubble quality, and the glass composition loses its component balance, with the result that the devitrification resistance is liable to lower. The lower limit range of the molar ratio $(Li_2O+Na_2O+K_2O)/Al_2O_3$ is suitably 1 or more, 1.2 or more, 1.4 or more, 1.5 or more, 1.7 or more, particularly suitably 1.8 or more. The upper limit range of the molar ratio $(Li_2O+Na_2O+K_2O)/Al_2O_3$ is suitably 3 or less, 2.8 or less, 2.6 or less, 2.5 or less, particularly suitably 2.3 or less. Further, when preference is put on the degradation coefficient D, the lower limit range of the molar ratio $(Li_2O+Na_2O+K_2O)/Al_2O_3$ is suitably 1 or more, particularly suitably 1.2 or more, and the upper limit range of the molar ratio $(Li_2O+Na_2O+K_2O)/Al_2O_3$ is suitably 3 or less, 2.5 or less, 2 or less, 1.8 or less, 1.5 or less, particularly suitably 1.4 or less.

Further, the molar ratio $(Li_2O+Na_2O+K_2O)/Al_2O_3$ falls within the range of suitably 1 to 3, 1.2 to 3, particularly suitably 1.2 to 2.5. When the molar ratio $(Li_2O+Na_2O+K_2O)/Al_2O_3$ and the molar ratio $Na_2O/Al_2O_3$ are each controlled in the above-mentioned range, the devitrification resistance and degradation coefficient D can be remarkably improved.

The molar ratio $K_2O/Na_2O$ falls within the range of suitably 0.1 to 0.8, 0.2 to 0.8, 0.2 to 0.5, particularly suitably 0.2 to 0.4. When the molar ratio $K_2O/Na_2O$ becomes small, the thickness of the compression stress layer is liable to decrease. On the other hand, when the molar ratio $K_2O/Na_2O$ becomes large, the compression stress value lowers, and the glass composition loses its component balance, with the result that the devitrification of the glass is liable to occur.

MgO is a component that reduces the high temperature viscosity of glass to enhance the meltability and formability, and increases the strain point and Young's modulus, and is a component that has a great effect of enhancing the ion exchange performance among alkaline earth metal oxides. Thus, the content of MgO is 0.5% or more, and the lower limit range thereof is suitably 1% or more, 1.5% or more, 2% or more, 3% or more, 5% or more, particularly suitably 6% or more. However, when the content of MgO is too large in glass, the density and thermal expansion coefficient increase, and the devitrification of the glass tends to occur easily. Thus, the content of MgO is 13% or less, and the upper limit range thereof is suitably 12% or less, 11% or less, 9% or less, 8% or less, 7% or less, particularly suitably 6.5% or less.

When the molar ratio $MgO/(MgO+Al_2O_3)$ decreases in glass, the ion exchange performance and Young's modulus are liable to lower, and the degradation coefficient D tends to increase. The lower limit range of the molar ratio $MgO/(MgO+Al_2O_3)$ is suitably 0.05 or more, 0.1 or more, 0.15 or more, 0.2 or more, 0.25 or more, particularly suitably 0.3 or more. On the other hand, when the molar ratio $MgO/(MgO+Al_2O_3)$ increases in glass, the devitrification resistance lowers, the density increases, and the thermal expansion coefficient becomes too high. The upper limit range of the molar ratio $MgO/(MgO+Al_2O_3)$ is suitably 0.95 or less, 0.9 or less, 0.85 or less, 0.8 or less, 0.7 or less, 0.6 or less, particularly suitably 0.5 or less. Note that the "$MgO+Al_2O_3$" is the total content of MgO and $Al_2O_3$.

CaO has great effects of reducing the high temperature viscosity of glass to enhance the meltability and formability and increasing the strain point and Young's modulus without causing any reduction in devitrification resistance as compared to other components. The content of CaO is 0 to 6%. However, when the content of CaO is too large in glass, the density and thermal expansion coefficient increase, and the glass composition loses its component balance, with the results that the glass is liable to devitrify to the worse, the ion exchange performance lowers, and the degradation coefficient D tends to increase. Thus, the content of CaO is suitably 0 to 5%, 0 to 4%, 0 to 3.5%, 0 to 3%, 0 to 2%, particularly suitably 0 to 1%.

It is preferred that the content of MgO be controlled in the above-mentioned range and the molar ratio $MgO/(MgO+CaO)$ be simultaneously controlled to preferably 0.5 or more, 0.55 or more, 0.6 or more, 0.7 or more, 0.8 or more, particularly preferably 0.9 or more. When the molar ratio $MgO/(MgO+CaO)$ decreases in glass, the degradation coefficient D tends to increase and the ion exchange performance tends to lower. Note that when the content of MgO does not fall within the above-mentioned range in glass, the glass composition loses its component balance, with the result that the devitrification resistance is liable to lower and the effects to be provided by controlling the molar ratio $MgO/(MgO+CaO)$ are difficult to be provided. Note that the "MgO+CaO" is the total content of MgO and CaO.

SrO is a component that reduces the high temperature viscosity of glass to enhance the meltability and formability, and increases the strain point and Young's modulus. The content of SrO is 0 to 6%. When the content of SrO is too large in glass, an ion exchange reaction is liable to be inhibited, and moreover, the density and thermal expansion coefficient increase and the devitrification of the glass occurs easily. The content of SrO is suitably 0 to 4.5%, 0 to 3%, 0 to 2%, 0 to 1.5%, 0 to 1%, 0 to 0.5%, particularly suitably 0 to 0.1%.

The tempered glass according to this embodiment is substantially free of $As_2O_3$, $Sb_2O_3$, PbO, and F in its glass composition from the standpoint of environmental considerations.

The following components, for example, may be further added to the components described above.

BaO is a component that reduces the high temperature viscosity of glass to enhance the meltability and formability, and increases the strain point and Young's modulus. When the content of BaO is too large in glass, an ion exchange reaction is liable to be inhibited, and moreover, the density and thermal expansion coefficient increase and the devitrification of the glass occurs easily. The content of BaO is suitably 0 to 6%, 0 to 3%, 0 to 1.5%, 0 to 1%, 0 to 0.5%, particularly suitably 0 to 0.1%.

When the content of SrO+BaO in glass is controlled suitably, the ion exchange performance can be enhanced remarkably. The content of SrO+BaO is suitably 0 to 6%, 0 to 3%, 0 to 2.5%, 0 to 2%, 0 to 1%, particularly suitably 0 to 0.2%. Note that the "SrO+BaO" is the total content of SrO and BaO.

The molar ratio (CaO+SrO+BaO)/MgO falls within the range of suitably 0 to 1, 0 to 0.9, 0 to 0.8, 0 to 0.75, particularly suitably 0 to 0.5. When the molar ratio (CaO+SrO+BaO)/MgO increases in glass, the devitrification resistance lowers, the ion exchange performance lowers, the degradation coefficient D increases, and the density and thermal expansion coefficient increase excessively. Note that the "CaO+SrO+BaO" is the total content of CaO, SrO, and BaO.

The content of MgO+CaO+SrO+BaO is preferably 0.5 to 10%, 0.5 to 8%, 0.5 to 7%, 0.5 to 6%, particularly preferably 0.5 to 4%. When the content of MgO+CaO+SrO+BaO is too small in glass, the meltability and formability cannot be easily enhanced. On the other hand, when the content of MgO+CaO+SrO+BaO is too large in glass, the density and thermal expansion coefficient increase, the devitrification resistance is liable to lower, and moreover, the ion exchange performance tends to lower. Note that the "MgO+CaO+SrO+BaO" is the total content of MgO, CaO, SrO, and BaO.

The mass ratio $(MgO+CaO+SrO+BaO)/(Li_2O+Na_2O+K_2O)$ is preferably 0.5 or less, 0.3 or less, particularly preferably 0.2 or less. When the mass ratio $(MgO+CaO+SrO+BaO)/(Li_2O+Na_2O+K_2O)$ increases in glass, the devitrification resistance tends to lower.

$TiO_2$ is a component that enhances the ion exchange performance of glass and a component that reduces the high temperature viscosity. When the content of $TiO_2$ is too large in glass, the glass is liable to be colored and to devitrify. Thus, the content of $TiO_2$ is preferably 0 to 3%, 0 to 1%, 0 to 0.8%, 0 to 0.5%, particularly preferably 0 to 0.1%.

$ZrO_2$ is a component that remarkably enhances the ion exchange performance of glass and a component that increases the viscosity of glass around the liquidus viscosity and the strain point. However, when the content of $ZrO_2$ is too large in glass, the devitrification resistance may lower remarkably and the density may increase excessively. Thus, the upper limit range of the content of $ZrO_2$ is suitably 10% or less, 8% or less, 6% or less, 4% or less, 3% or less, particularly suitably 1% or less. Note that, when the enhancement of the ion exchange performance of glass is intended, the lower limit range of the content of $ZrO_2$ is suitably 0.01% or more, 0.1% or more, 0.5% or more, 1% or more, particularly suitably 2% or more.

ZnO is a component that enhances the ion exchange performance of glass and a component that has a great effect of increasing the compression stress value, in particular. Further, ZnO is a component that reduces the high temperature viscosity of glass without reducing the low temperature viscosity. However, when the content of ZnO is too large in glass, the glass manifests phase separation, the devitrification resistance lowers, the density increases, and the thickness of each compression stress layer in the glass tends to decrease. Thus, the content of ZnO is preferably 0 to 6%, 0 to 5%, 0 to 3%, particularly preferably 0 to 1%.

$P_2O_5$ is a component that enhances the ion exchange performance of glass and a component that increases the thickness of each compression stress layer, in particular. However, when the content of $P_2O_5$ is too large in glass, the glass manifests phase separation, and the water resistance is liable to lower. Thus, the content of $P_2O_5$ is preferably 0 to 10%, 0 to 3%, 0 to 1%, particularly preferably 0 to 0.5%.

As a fining agent, one kind or two or more kinds selected from the group consisting of $CeO_2$, $SnO_2$, Cl, and $SO_3$ (preferably the group consisting of $SnO_2$, Cl, and $SO_3$) may be added at 0 to 3%. The content of $SnO_2$+SO +Cl is preferably 0 to 1%, 0.001 to 1%, 0.01 to 0.5%, particularly preferably 0.03 to 0.2%. Note that the "$SnO_2$+$SO_3$+Cl" is the total amount of $SnO_2$, Cl, and $SO_3$.

$SnO_2$ has not only an effect of fining glass but also an effect of enhancing the ion exchange performance of glass. Thus, the addition of $SnO_2$ can provide the effect of fining glass and the effect of enhancing the ion exchange performance of glass at the same time. The content of $SnO_2$ is preferably 0 to 3%, 0.01 to 3%, 0.01 to 3%, particularly preferably 0.1 to 1%. On the other hand, the addition of $SnO_2$ sometimes results in the coloration of the resultant glass, and hence, when it is necessary for the effect of fining glass to be exerted while the coloration of glass is suppressed, $SO_3$ is preferably added. The content of $SO_3$ is preferably 0 to 3%, particularly preferably 0.001 to 3%. Note that the coexistence of $SnO_2$ and $SO_3$ in glass enables the suppression of the coloration while enabling the enhancement of the ion exchange performance.

The content of $Fe_2O_3$ is preferably less than 1,000 ppm (less than 0.1%), less than 800 ppm, less than 600 ppm, less than 400 ppm, particularly preferably less than 300 ppm. Further, the molar ratio $Fe_2O_3/(Fe_2O_3+SnO_2)$ is controlled to preferably 0.8 or more, 0.9 or more, particularly preferably 0.95 or more, while the content of $Fe_2O_3$ is controlled in the above-mentioned range. As a result, the transmittance (400 nm to 770 nm) of glass having a thickness of 1 mm is likely to improve (for example, 90% or more).

A rare earth oxide such as $Nb_2O_5$ or $La_2O_3$ is a component that enhances the Young's modulus. However, the cost of the raw material itself is high, and when the rare earth oxide is added in a large amount, the devitrification resistance is liable to deteriorate. Thus, the content of the rare earth oxide is preferably 3% or less, 2% or less, 1% or less, 0.5% or less, particularly preferably 0.1% or less.

A transition metal element (such as Co or Ni) that causes the intense coloration of glass may reduce the transmittance of glass. In particular, when the content of the transition metal element is too large in glass to be used for a touch panel display, the visibility of the touch panel display is liable to deteriorate. Thus, it is preferred to select a glass raw material (including cullet) so that the content of a transition metal oxide is 0.5% or less, 0.1% or less, particularly 0.05% or less.

The tempered glass according to this embodiment is preferably substantially free of $Bi_2O_3$ from the standpoint of environmental considerations. The gist of the phrase "substantially free of $Bi_2O_3$" resides in that $Bi_2O_3$ is not added positively as a glass component, but contamination with $Bi_2O_3$ as an impurity is allowable. Specifically, the phrase means that the content of $Bi_2O_3$ is less than 0.05 mol %.

In the tempered glass according to this embodiment, the suitable content range of each component can be appropriately selected to attain a suitable glass composition range. Of those, particularly suitable glass composition ranges are as described below.

(1) The glass contains, as a glass composition in terms of mol %, 50 to 75% of $SiO_2$, 4 to 12% of $Al_2O_3$, 0 to 1% of $B_2O_3$, 0 to 1% of $Li_2O$, 10 to 17% of $Na_2O$, 2 to 7% of $K_2O$, 1.5 to 12% of MgO, 0 to 3% of CaO, 0 to 1% of SrO, and 0 to 0.5% of $TiO_2$, and has a molar ratio MgO/(MgO+CaO) of 0.5 to 1.

(2) The glass contains, as a glass composition in terms of mol %, 50 to 75% of $SiO_2$, 4 to 12% of $Al_2O_3$, 0 to 1% of $B_2O_3$, 0 to 1% of $Li_2O$, 10 to 17% of $Na_2O$, 2 to 7% of $K_2O$, 1.5 to 12% of MgO, 0 to 3% of CaO, 0 to 1% of SrO, and 0 to 0.5% of $TiO_2$, and has a molar ratio MgO/(MgO+CaO) of 0.5 to 1, a molar ratio MgO/(MgO+$Al_2O_3$) of 0.2 to 0.85, and a molar ratio (CaO+SrO+BaO)/MgO of 0 to 0.85.

(3) The glass contains, as a glass composition in terms of mol %, 55 to 69% of $SiO_2$, 4 to 11% of $Al_2O_3$, 0 to 1% of $B_2O_3$, 0 to 1% of $Li_2O$, 11 to 16% of $Na_2O$, 2 to 7% of $K_2O$, 3 to 9% of MgO, 0 to 3% of CaO, 0 to 1% of SrO, 1 to 9% of $ZrO_2$, and 0 to 0.1% of $TiO_2$, and has a molar ratio MgO/(MgO+CaO) of 0.5 to 1.

(4) The glass contains, as a glass composition in terms of mol %, 55 to 69% of $SiO_2$, 4 to 11% of $Al_2O_3$, 0 to 1% of $B_2O_3$, 0 to 1% of $Li_2O$, 11 to 16% of $Na_2O$, 2 to 7% of $K_2O$, 3 to 9% of MgO, 0 to 3% of CaO, 0 to 1% of SrO, 1 to 9% of $ZrO_2$, and 0 to 0.1% of $TiO_2$, and has a molar ratio MgO/(MgO+CaO) of 0.5 to 1, a molar ratio MgO/(MgO+$Al_2O_3$) of 0.25 to 0.8, and a molar ratio (CaO+SrO+BaO)/MgO of 0 to 0.75.

(5) The glass contains, as a glass composition in terms of mol %, 58 to 67% of $SiO_2$, 4 to 11% of $Al_2O_3$, 0 to 0.5% of $B_2O_3$, 0 to 0.5% of $Li_2O$, 11 to 16% of $Na_2O$, 2 to 6% of $K_2O$, 3 to 6.5% of MgO, 0 to 3% of CaO, 0 to 0.5% of SrO, 2 to 6% of $ZrO_2$, and 0 to 0.1% of $TiO_2$, and has a molar ratio MgO/(MgO+CaO) of 0.5 to 1, a molar ratio MgO/(MgO+$Al_2O_3$) of 0.25 to 0.8, and a molar ratio (CaO+SrO+BaO)/MgO of 0 to 0.75.

(6) The glass contains, as a glass composition in terms of mol %, 58 to 67% of $SiO_2$, 7 to 11% of $Al_2O_3$, 0 to 0.5% of $B_2O_3$, 0 to 0.5% of $Li_2O$, 11 to 16% of $Na_2O$, 2 to 6% of $K_2O$, 3 to 6.5% of MgO, 0 to 3% of CaO, 0 to 0.5% of SrO, 2 to 6% of $ZrO_2$, and 0 to 0.1% of $TiO_2$, and has a molar ratio MgO/(MgO+CaO) of 0.5 to 1, a molar ratio MgO/(MgO+$Al_2O_3$) of 0.25 to 0.8, and a molar ratio (CaO+SrO+BaO)/MgO of 0 to 0.75.

Further, when it is intended to produce a tempered glass having a lower density and higher ion exchange performance, the following glass composition ranges are preferred.

(7) The glass contains, as a glass composition in terms of mol %, 50 to 75% of $SiO_2$, 10 to 13% of $Al_2O_3$, 0 to 1.5% of $B_2O_3$, 0 to 2% of $Li_2O$, 12 to 20% of $Na_2O$, 0.5 to 9% of $K_2O$, 3 to 12% of MgO, 0 to 6% of CaO, and 0 to 6% of SrO.

(8) The glass contains, as a glass composition in terms of mol %, 55 to 75% of $SiO_2$, 10 to 13% of $Al_2O_3$, 0 to 1.5% of $B_2O_3$, 0 to 2% of $Li_2O$, 13 to 20% of $Na_2O$, 1 to 8% of $K_2O$, 6 to 12% of MgO, 0 to 6% of CaO, 0 to 6% of SrO, and 0 to 1% of $ZrO_2$, and has a molar ratio MgO/(MgO+CaO) of 0.5 to 1, a molar ratio MgO/(MgO+$Al_2O_3$) of 0.1 to 0.9, and a molar ratio (CaO+SrO+BaO)/MgO of 0 to 0.75.

(9) The glass contains, as a glass composition in terms of mol %, 55 to 75% of $SiO_2$, 10 to 13% of $Al_2O_3$, 0 to 1.5% of $B_2O_3$, 0 to 2% of $Li_2O$, 13 to 20% of $Na_2O$, 1 to 8% of $K_2O$, 6 to 12% of MgO, 0 to 6% of CaO, 0 to 6% of SrO, and 0 to 1% of $ZrO_2$, and has a molar ratio MgO/(MgO+CaO) of 0.7 to 1, a molar ratio MgO/(MgO+$Al_2O_3$) of 0.25 to 0.6, and a molar ratio (CaO+SrO+BaO)/MgO of 0 to 0.5.

(10) The glass contains, as a glass composition in terms of mol %, 55 to 75% of $SiO_2$, 10 to 13% of $Al_2O_3$, 0 to 1% of $B_2O_3$, 0 to 2% of $Li_2O$, 13 to 20% of $Na_2O$, 1 to 8% of $K_2O$, 6 to 12% of MgO, 0 to 6% of CaO, 0 to 6% of SrO, and 0 to 1% of $ZrO_2$, and has a molar ratio MgO/(MgO+CaO) of 0.7 to 1, a molar ratio MgO/(MgO+$Al_2O_3$) of 0.25 to 0.6, and a molar ratio (CaO+SrO+BaO)/MgO of 0 to 0.5.

(11) The glass contains, as a glass composition in terms of mol %, 55 to 70% of $SiO_2$, 10 to 13% of $Al_2O_3$, 0 to 0.1% of $B_2O_3$, 0 to 0.2% of $Li_2O$, 13 to 20% of $Na_2O$, 1 to 8% of $K_2O$, 6 to 12% of MgO, 0 to 6% of CaO, 0 to 6% of SrO, and 0 to 1% of $ZrO_2$, and has a molar ratio MgO/(MgO+CaO) of 0.7 to 1, a molar ratio MgO/(MgO+$Al_2O_3$) of 0.25 to 0.6, and a molar ratio (CaO+SrO+BaO)/MgO of 0 to 0.5.

The tempered glass according to this embodiment preferably has the following properties, for example.

The tempered glass according to this embodiment has a compression stress layer in a surface thereof. The compression stress value of the compression stress layer is preferably 300 MPa or more, 400 MPa or more, 500 MPa or more, 600 MPa or more, particularly preferably 900 MPa or more. As the compression stress value becomes larger, the mechanical strength of the tempered glass becomes higher. On the other hand, when an extremely large compression stress is formed on the surface of the tempered glass, micro cracks are generated on the surface, which may reduce the mechanical strength of the tempered glass to the worse. Further, a tensile stress inherent in the tempered glass may extremely increase. Thus, the compression stress value of the compression stress layer is preferably 2,000 MPa or less. Note that there is a tendency that the compression stress value is increased by increasing the content of $Al_2O_3$, $TiO_2$, $ZrO_2$, MgO, or ZnO in the glass composition or by decreasing the content of SrO or BaO in the glass composition. Further, there is a tendency that the compression stress value is increased by shortening a time necessary for ion exchange or by decreasing the temperature of an ion exchange solution.

The thickness of the compression stress layer is preferably 10 μm or more, 15 μm or more, 20 μm or more, 30 μm or more, particularly preferably 40 μm or more. As the thickness of the compression stress layer becomes larger, the tempered glass is more hardly cracked even when the tempered glass has a deep flaw, and a variation in the mechanical strength of the tempered glass becomes smaller. On the other hand, as the thickness of the compression stress layer becomes larger, it becomes more difficult to cut the tempered glass. Thus, the thickness of the compression stress layer is preferably 500 μm or less. Note that there is a tendency that the thickness of the compression stress layer is increased by increasing the content of $K_2O$ or $P_2O_5$ in the glass composition or by decreasing the content of SrO or BaO in the glass composition. Further, there is a tendency that the thickness of the compression stress layer is increased by lengthening a time necessary for ion exchange or by increasing the temperature of an ion exchange solution.

The tempered glass according to this embodiment has a density of preferably 2.6 g/cm³ or less, 2.55 g/cm³ or less, 2.50 g/cm³ or less, particularly preferably 2.48 g/cm³ or less. As the density becomes smaller, the weight of the tempered glass can be reduced more. Note that the density is easily reduced by increasing the content of $SiO_2$, $B_2O_3$, or $P_2O_5$ in the glass composition or by decreasing the content of an alkali metal oxide, an alkaline earth metal oxide, ZnO, $ZrO_2$, or $TiO_2$ in the glass composition.

The tempered glass according to this embodiment has a thermal expansion coefficient in the temperature range of 30 to 380° C. of preferably 80 to $120 \times 10^{-7}$/° C., 85 to $110 \times 10^{-7}$/° C., 90 to $110 \times 10^{-7}$/° C., particularly preferably 90 to $105 \times 10^{-7}$/° C. When the thermal expansion coefficient is controlled within the above-mentioned ranges, it becomes easy to match the thermal expansion coefficient with those of members made of a metal, an organic adhesive, and the like, and the members made of a metal, an organic adhesive, and the like are easily prevented from being peeled off. Herein, the phrase "thermal expansion coefficient in the temperature range of 30 to 380° C." refers to a value obtained through measurement of an average thermal expansion coefficient with a dilatometer. Note that the thermal expansion coefficient is easily increased by increasing the content of an alkali metal oxide or an alkaline earth metal oxide in the glass composition, and in contrast, the thermal expansion coefficient is easily decreased by reducing the content of the alkali metal oxide or the alkaline earth metal oxide.

The tempered glass according to this embodiment has a strain point of preferably 500° C. or more, 520° C. or more, 530° C. or more, particularly preferably 540° C. or more. As the strain point becomes higher, the heat resistance is improved more, and the disappearance of the compression stress layer more hardly occurs when the tempered glass is subjected to thermal treatment. Further, as the strain point becomes higher, stress relaxation more hardly occurs during ion exchange treatment, and thus the compression stress value can be maintained more easily. Note that the strain point is easily increased by increasing the content of an alkaline earth metal oxide, $Al_2O_3$, $ZrO_2$, or $P_2O_5$ in the glass composition or by reducing the content of an alkali metal oxide in the glass composition.

The tempered glass according to this embodiment has a temperature at $10^{4.0}$ dPa·s of preferably 1,250° C. or less, 1,230° C. or less, 1,200° C. or less, 1,180° C. or less, particularly preferably 1,160° C. or less. As the temperature at $10^{4.0}$ dPa·s becomes lower, a burden on a forming facility is reduced more, the forming facility has a longer life, and consequently, the production cost of the tempered glass is more likely to be reduced. The temperature at $10^{4.0}$ dPa·s is easily decreased by increasing the content of an alkali metal oxide, an alkaline earth metal oxide, ZnO, $B_2O_3$, or $TiO_2$ or by reducing the content of $SiO_2$ or $Al_2O_3$.

The tempered glass according to this embodiment has a temperature at $10^{2.5}$ dPa·s of preferably 1,600° C. or less, 1,550° C. or less, 1,530° C. or less, 1,500° C. or less, particularly preferably 1,450° C. or less. As the temperature at $10^{2.5}$ dPa·s becomes lower, melting at lower temperature can be carried out, and hence a burden on glass production equipment such as a melting furnace is reduced more, and the bubble quality of glass is improved more easily. That is, as the temperature at $10^{2.5}$ dPa·s becomes lower, the production cost of the tempered glass is more likely to be reduced. Note that the temperature at $10^{2.5}$ dPa·s corresponds to a melting temperature. Further, the temperature at $10^{2.5}$ dPa·s is easily decreased by increasing the content of an alkali metal oxide, an alkaline earth metal oxide, ZnO, $B_2O_3$, or $TiO_2$ in the glass composition or by reducing the content of $SiO_2$ or $Al_2O_3$ in the glass composition.

The tempered glass according to this embodiment has a liquidus temperature of preferably 1,075° C. or less, 1,050° C. or less, 1,030° C. or less, 1,010° C. or less, 1,000° C. or less, 950° C. or less, 900° C. or less, particularly preferably 870° C. or less. Note that as the liquidus temperature becomes lower, the devitrification resistance and formability are improved more. Further, the liquidus temperature is easily decreased by increasing the content of $Na_2O$, $K_2O$, or $B_2O_3$ in the glass composition or by reducing the content of $Al_2O_3$, $Li_2O$, MgO, ZnO, $TiO_2$, or $ZrO_2$.

The tempered glass according to this embodiment has a liquidus viscosity of preferably $10^{4.0}$ dPa·s or more, $10^{4.4}$ dPa·s or more, $10^{4.8}$ dPa·s or more, $10^{5.0}$ dPa·s or more, $10^{5.3}$ dPa·s or more, $10^{5.5}$ dPa·s or more, $10^{5.7}$ dPa·s or more, $10^{5.8}$ dPa·s or more, particularly preferably $10^{6.0}$ dPa·s or more. Note that as the liquidus viscosity becomes higher, the devitrification resistance and formability are improved more. Further, the liquidus viscosity is easily increased by increasing the content of $Na_2O$ or $K_2O$ in the glass composition or by reducing the content of $Al_2O_3$, $Li_2O$, MgO, ZnO, $TiO_2$, or $ZrO_2$ in the glass composition.

The tempered glass according to this embodiment preferably has preferably a Young's modulus of 65 GPa or more, 69 GPa or more, 71 GPa or more, 75 GPa or more, particularly preferably 77 GPa or more. As the Young's modulus becomes higher, the tempered glass is less deflected. Thus, in the case where the tempered glass is used for a touch panel display or the like, the degree of deformation in the tempered glass becomes smaller even when the surface of the tempered glass is pressed strongly with a pen or the like. As a result, the tempered glass is easily prevented from coming into contact with a liquid crystal device positioned behind the glass to cause a display failure.

The tempered glass according to this embodiment has a degradation coefficient D of preferably 0.6 or less, 0.5 or less, 0.4 or less, 0.3 or less, 0.2 or less, 0.1 or less, particularly preferably 0.05 or less. As the degradation coefficient D becomes smaller, even when a glass to be tempered is subjected to ion exchange treatment in a $KNO_3$ molten salt degraded with age, the resultant tempered glass is less likely to show a low compression stress value. As a result, the production cost of the tempered glass is likely to be reduced.

The tempered glass sheet according to an embodiment of the present invention includes the tempered glass according to the above-mentioned embodiment. Thus, the technical features and suitable ranges of the tempered glass sheet according to this embodiment are the same as those of the tempered glass according to this embodiment. Herein, the descriptions thereof are omitted for convenience sake.

The tempered glass sheet according to this embodiment has a ΔCS value of preferably 50 MPa or less, 30 MPa or less, 20 MPa or less, 10 MPa or less, particularly preferably 5 MPa or less, the ΔCS value being a difference in compression stress values of compression stress layers between surfaces opposite to each other. As the ΔCS value becomes larger, after ion exchange treatment of a large glass sheet, the resultant tempered glass sheet is more liable to have warpage. In order to control the ΔCS value within any of the above-mentioned ranges, the surfaces opposite to each other of the glass sheet are polished by preferably 0.2 μm or more, 0.3 μm or more, 0.4 μm or more, 0.5 μm or more, 1 μm or more, 3 μm or more, particularly preferably 5 μm or more.

The tempered glass sheet according to this embodiment has a surface having an average surface roughness (Ra) of preferably 10 Å or less, 8 Å or less, 6 Å or less, 4 Å or less, 3 Å or less, particularly preferably 2 Å or less. A tempered glass sheet having a larger average surface roughness (Ra) tends to have reduced mechanical strength. Herein, the average surface roughness (Ra) refers to a value obtained by a measurement method in accordance with SEMI D7-97 "FPD glass substrate surface roughness measurement method."

The tempered glass sheet according to this embodiment has a length of preferably 500 mm or more, 700 mm or more, particularly preferably 1,000 mm or more, and a width of 500 mm or more, 700 mm or more, particularly preferably 1,000 mm or more. A larger tempered glass sheet can be more suitably used for a cover glass for a display part of a large-screen television or the like.

The tempered glass sheet according to this embodiment has a thickness of preferably 3.0 mm or less, 2.0 mm or less, 1.5 mm or less, 1.3 mm or less, 1.1 mm or less, 1.0 mm or less, 0.8 mm or less, particularly preferably 0.7 mm or less. On the other hand, when the sheet thickness is excessively small, desired mechanical strength is hardly provided. Thus, the thickness is preferably 0.1 mm or more, 0.2 mm or more, 0.3 mm or more, 0.4 mm or more, particularly preferably 0.5 mm or more.

The glass to be tempered according to an embodiment of the present invention is subjected to ion exchange treatment, includes, as a glass composition in terms of mol %, 50 to 75% of $SiO_2$, 3 to 13% of $Al_2O_3$, 0 to 1.5% of $B_2O_3$, 0 to 4% of $Li_2O$, 7 to 20% of $Na_2O$, 0 to 10% of $K_2O$, 0.5 to 13% of MgO, 0 to 6% of CaO, and 0 to 4.5% of SrO, and is substantially free of $As_2O_3$, $Sb_2O_3$, PbO, and F. The technical features of the glass to be tempered according to this embodiment are the same as those of the tempered glass and tempered glass sheet according to the above-mentioned embodiments. Herein, the descriptions thereof are omitted for convenience sake.

When the glass to be tempered according to this embodiment is subjected to ion exchange treatment in a $KNO_3$ molten salt at 430° C., it is preferred that the compression stress value of a compression stress layer in a surface thereof be 300 MPa or more and the thickness of a compression stress layer be 10 μm or more, it is more preferred that the compression stress of a surface thereof be 600 MPa or more and the thickness of a compression stress layer be 50 μm or more, and it is still more preferred that the compression stress of a surface thereof be 700 MPa or more and the thickness of a compression stress layer be 50 μm or more.

When ion exchange treatment is performed, the temperature of the $KNO_3$ molten salt is preferably 360 to 550° C., and the ion exchange time is preferably 2 to 10 hours, particularly preferably 4 to 8 hours. Under the conditions, the compression stress layer can be properly formed easily. Note that the glass to be tempered according to this embodiment has the above-mentioned glass composition, and hence the compression stress value and thickness of the compression stress layer can be increased without using a mixture of a $KNO_3$ molten salt and an $NaNO_3$ molten salt or the like. Further, even when a degraded $KNO_3$ molten salt is used, the compression stress value and thickness of the compression stress layer do not become extremely small.

The glass sheet to be tempered according to this embodiment has an Fmax value of preferably 5 MPa or less, 3 MPa or less, 1 MPa or less, 0.5 MPa or less, particularly preferably 0.1 MPa or less, the Fmax value being the maximum value of residual stresses in a planar direction with respect to all planar portions. When the maximum value of residual stresses, Fmax value, is large, in the tempering treatment of a large glass sheet, the warpage of the resultant tempered glass sheet sometimes increases.

The glass sheet to be tempered according to this embodiment preferably has a film made of $SiO_2$, $TiO_2$, NESA, ITO, AR, or the like formed in a surface thereof. This allows the warpage of the resultant tempered glass sheet to be reduced without applying polishing treatment. As a method of forming such film, there is given, CVD, sputtering, spin coating, or the like. When a film is formed by sputtering, the film has a thickness of preferably 1 nm or more, 5 nm or more, 10 nm or more, 30 nm or more, particularly preferably 50 nm or more. On the other hand, when the thickness is too large, the compression stress value of a compression stress layer in the film may excessively lower. Thus, the upper limit range of the thickness is suitably 1,000 nm or less, 800 nm or less, 500 nm or less, particularly suitably 300 nm or less. Note that a film is preferably formed at a portion at which warpage is liable to occur after tempering treatment. Note that the tempered glass sheet according to this embodiment preferably has a film made of $SiO_2$, $TiO_2$, NESA, ITO, AR, or the like formed in a surface thereof before tempering treatment.

The glass to be tempered, tempered glass, and tempered glass sheet according to this embodiment can be produced as follows.

First, glass raw materials blended so as to have the above-mentioned glass composition are loaded into a continuous melting furnace and are melted under heating at 1,500 to 1,600° C. to perform fining of glass. After that, the molten glass is cast into a forming apparatus to form a sheet-shaped glass or the like, followed by annealing, thus being able to produce a glass having a sheet shape or the like.

A float method is preferably adopted as a method of forming molten glass into a sheet-shaped glass. The float method is a method by which a large number of glass sheets can be produced at low cost and is a method by which even a large glass sheet can be easily produced.

Any of various forming methods other than the float method may be adopted. It is possible to adopt a forming method such as an overflow down-draw method, a down-draw method (such as a slot down method or a re-draw method), a roll out method, or a press method.

Next, the resultant glass can be subjected to tempering treatment to produce a tempered glass. The resultant glass may be cut into pieces having a predetermined size before the tempering treatment, but the cutting after the tempering treatment is advantageous in terms of cost.

Ion exchange treatment is preferably used as the tempering treatment. Conditions for the ion exchange treatment are not particularly limited, and optimum conditions may be selected in view of, for example, the viscosity properties, applications, thickness, and inner tensile stress of glass. The ion exchange treatment can be performed, for example, by immersing glass in a $KNO_3$ molten salt at 400 to 550° C. for 1 to 8 hours. Particularly when the ion exchange of K ions in the $KNO_3$ molten salt with Na components in the glass is performed, it is possible to form efficiently a compression stress layer in a surface of the glass.

EXAMPLE 1

Hereinafter, examples of the present invention are described. Note that the following examples are merely illustrative. The present invention is by no means limited to the following examples.

Tables 1 to 5 show examples of the present invention (sample Nos. 1 to 24). Note that, in the tables, the term "Unmeasured" means that measurement has not yet been performed.

TABLE 1

| | | Example | | | | |
|---|---|---|---|---|---|---|
| | | No. 1 | No. 2 | No. 3 | No. 4 | No. 5 |
| Glass | $SiO_2$ | 64.1 | 63.2 | 64.2 | 64.9 | 65.2 |
| composition | $Al_2O_3$ | 8.6 | 8.4 | 9.1 | 7.7 | 7.8 |
| (mol %) | $Li_2O$ | 0.2 | 0.2 | 0.2 | 0.2 | 0.2 |
| | $Na_2O$ | 15.7 | 15.5 | 14.4 | 15.4 | 13.8 |
| | $K_2O$ | 3.6 | 4.9 | 4.6 | 3.8 | 4.9 |
| | MgO | 3.3 | 3.3 | 3.3 | 3.3 | 3.3 |
| | CaO | 2.3 | 2.4 | 2.4 | 2.3 | 2.4 |
| | $ZrO_2$ | 2.2 | 2.1 | 1.9 | 2.4 | 2.4 |
| MgO/(MgO + CaO) | | 0.59 | 0.58 | 0.58 | 0.58 | 0.58 |
| MgO/($Al_2O_3$ + MgO) | | 0.3 | 0.3 | 0.3 | 0.3 | 0.3 |
| (CaO + SrO + BaO)/MgO | | 0.7 | 0.7 | 0.7 | 0.7 | 0.7 |
| $\rho$ (g/cm$^3$) | | 2.54 | 2.54 | 2.52 | 2.54 | 2.54 |
| $\alpha$ ($\times 10^{-7}$/° C.) | | 101 | 107 | 101 | 102 | 102 |
| Ps (° C.) | | 530 | 520 | 534 | 526 | 531 |
| Ta (° C.) | | 574 | 563 | 578 | 570 | 575 |
| Ts (° C.) | | 789 | 774 | 798 | 784 | 794 |
| $10^4$ dPa · s (° C.) | | 1,139 | 1,122 | 1,156 | 1,134 | 1,149 |
| $10^3$ dPa · s (° C.) | | 1,319 | 1,299 | 1,339 | 1,312 | 1,330 |
| $10^{2.5}$ dPa · s (° C.) | | 1,433 | 1,412 | 1,455 | 1,426 | 1,445 |
| TL (° C.) | | 870 | 850 | 880 | 875 | 875 |
| $\log_{10}\eta$TL (dPa · s) | | 6.4 | 5.8 | 6.5 | 6.5 | 6.5 |
| CS (MPa) New $KNO_3$ | | 862 | 791 | 838 | 839 | 834 |
| DOL (μm) New $KNO_3$ | | 44 | 49 | 47 | 45 | 49 |
| CS (MPa) Old $KNO_3$ | | 679 | 646 | 681 | 685 | 651 |
| DOL (μm) Old $KNO_3$ | | 44 | 49 | 47 | 44 | 48 |
| D | | 0.21 | 0.18 | 0.19 | 0.18 | 0.22 |

TABLE 2

| | | Example | | | | |
|---|---|---|---|---|---|---|
| | | No. 6 | No. 7 | No. 8 | No. 9 | No. 10 |
| Glass composition (mol %) | $SiO_2$ | 64.0 | 64.0 | 64.1 | 63.6 | 61.0 |
| | $Al_2O_3$ | 8.8 | 8.6 | 8.4 | 9.1 | 12.9 |
| | $Li_2O$ | 0.2 | 0.2 | 0.2 | 0.2 | 0.0 |
| | $Na_2O$ | 15.8 | 15.8 | 15.4 | 15.4 | 15.9 |
| | $K_2O$ | 3.9 | 3.9 | 3.8 | 3.9 | 3.5 |
| | MgO | 3.3 | 3.3 | 3.3 | 3.3 | 6.5 |
| | CaO | 1.7 | 1.7 | 2.4 | 2.4 | 0.0 |
| | $ZrO_2$ | 2.4 | 2.5 | 2.4 | 2.1 | 0.0 |
| | $SnO_2$ | 0.0 | 0.0 | 0.0 | 0.0 | 0.1 |
| MgO/(MgO + CaO) | | 0.67 | 0.67 | 0.58 | 0.58 | 1.0 |
| MgO/($Al_2O_3$ + MgO) | | 0.3 | 0.3 | 0.3 | 0.3 | 0.3 |
| (CaO + SrO + BaO)/MgO | | 0.5 | 0.5 | 0.7 | 0.7 | 0.0 |
| $\rho$ (g/cm$^3$) | | 2.54 | 2.54 | 2.54 | 2.54 | 2.48 |
| $\alpha$ (×10$^{-7}$/° C.) | | 103 | 103 | 102 | 102 | 102 |
| Ps (° C.) | | 533 | 534 | 533 | 536 | 585 |
| Ta (° C.) | | 578 | 579 | 576 | 580 | 634 |
| Ts (° C.) | | 798 | 799 | 793 | 796 | 866 |
| $10^4$ dPa · s (° C.) | | 1,152 | 1,149 | 1,142 | 1,147 | 1,225 |
| $10^3$ dPa · s (° C.) | | 1,333 | 1,327 | 1,319 | 1,326 | 1,412 |
| $10^{2.5}$ dPa · s (° C.) | | 1,449 | 1,441 | 1,431 | 1,440 | 1,528 |
| TL (° C.) | | 870 | 880 | 880 | 870 | 1,150 |
| $\log_{10}\eta$TL (dPa · s) | | 6.6 | 6.5 | 6.4 | 6.5 | 4.5 |
| CS (MPa) New $KNO_3$ | | 860 | 853 | 886 | 901 | 1,019 |
| DOL (μm) New $KNO_3$ | | 50 | 49 | 44 | 45 | 65 |
| CS (MPa) Old $KNO_3$ | | 727 | 719 | 730 | 733 | 822 |
| DOL (μm) Old $KNO_3$ | | 48 | 49 | 43 | 46 | 60 |
| D | | 0.15 | 0.16 | 0.18 | 0.19 | 0.19 |

TABLE 3

| | | Example | | | | |
|---|---|---|---|---|---|---|
| | | No. 11 | No. 12 | No. 13 | No. 14 | No. 15 |
| Glass composition (mol %) | $SiO_2$ | 65.0 | 64.2 | 63.4 | 62.6 | 61.1 |
| | $Al_2O_3$ | 9.5 | 10.1 | 10.8 | 11.5 | 11.6 |
| | $Na_2O$ | 15.6 | 15.6 | 15.7 | 15.8 | 16.0 |
| | $K_2O$ | 3.4 | 3.4 | 3.4 | 3.5 | 3.5 |
| | MgO | 6.4 | 6.4 | 6.4 | 6.5 | 6.5 |
| | $ZrO_2$ | 0.0 | 0.0 | 0.0 | 0.0 | 1.1 |
| | $SnO_2$ | 0.1 | 0.1 | 0.1 | 0.1 | 0.1 |
| MgO/(MgO + CaO) | | 1.0 | 1.0 | 1.0 | 1.0 | 1.0 |
| MgO/($Al_2O_3$ + MgO) | | 0.4 | 0.4 | 0.4 | 0.4 | 0.4 |
| (CaO + SrO + BaO)/MgO | | 0.0 | 0.0 | 0.0 | 0.0 | 0.0 |
| $\rho$ (g/cm$^3$) | | 2.46 | 2.46 | 2.47 | 2.47 | 2.50 |
| $\alpha$ (×10$^{-7}$/° C.) | | 101 | 102 | 102 | 102 | 103 |
| Ps (° C.) | | 540 | 548 | 558 | 567 | 586 |
| Ta (° C.) | | 585 | 595 | 606 | 614 | 635 |
| Ts (° C.) | | 811 | 822 | 834 | 844 | 862 |
| $10^4$ dPa · s (° C.) | | 1,182 | 1,192 | 1,203 | 1,208 | 1,209 |
| $10^3$ dPa · s (° C.) | | 1,380 | 1,387 | 1,398 | 1,398 | 1,390 |
| $10^{2.5}$ dPa · s (° C.) | | 1,505 | 1,510 | 1,522 | 1,517 | 1,505 |
| TL (° C.) | | Unmeasured | 980 | 1,000 | Unmeasured | Unmeasured |
| $\log_{10}\eta$TL (dPa · s) | | Unmeasured | 5.7 | 5.6 | Unmeasured | Unmeasured |
| CS (MPa) New $KNO_3$ | | 869 | 746 | 758 | 903 | 1,047 |
| DOL (μm) New $KNO_3$ | | 67 | 75 | 64 | 67 | 59 |
| CS (MPa) Old $KNO_3$ | | 743 | 625 | 647 | 785 | 851 |
| DOL (μm) Old $KNO_3$ | | 59 | 71 | 60 | 61 | 56 |
| D | | 0.14 | 0.16 | 0.15 | 0.13 | 0.19 |

TABLE 4

| | | Example | | | | |
|---|---|---|---|---|---|---|
| | | No. 16 | No. 17 | No. 18 | No. 19 | No. 20 |
| Glass composition (mol %) | SiO$_2$ | 64.9 | 64.9 | 64.9 | 64.9 | 64.9 |
| | Al$_2$O$_3$ | 11.0 | 11.0 | 13.0 | 13.0 | 9.0 |
| | Na$_2$O | 16.0 | 14.0 | 14.0 | 14.0 | 18.0 |
| | K$_2$O | 2.0 | 4.0 | 2.0 | 2.0 | 2.0 |
| | MgO | 6.0 | 6.0 | 6.0 | 3.0 | 3.0 |
| | CaO | 0.0 | 0.0 | 0.0 | 3.0 | 0.0 |
| | ZrO$_2$ | 0.0 | 0.0 | 0.0 | 0.0 | 3.0 |
| | SnO$_2$ | 0.1 | 0.1 | 0.1 | 0.1 | 0.1 |
| MgO/(MgO + CaO) | | 1.0 | 1.0 | 1.0 | 0.5 | 1.0 |
| MgO/(Al$_2$O$_3$ + MgO) | | 0.4 | 0.4 | 0.3 | 0.2 | 0.3 |
| (CaO + SrO + BaO)/MgO | | 0.0 | 0.0 | 0.0 | 1.0 | 0.0 |
| ρ (g/cm$^3$) | | 2.46 | 2.46 | 2.46 | 2.47 | 2.54 |
| α (×10$^{-7}$/° C.) | | 98 | 101 | 91 | 92 | 99 |
| Ps (° C.) | | 564 | 562 | 616 | 589 | 559 |
| Ta (° C.) | | 612 | 610 | 669 | 637 | 605 |
| Ts (° C.) | | 843 | 847 | 916 | 872 | 832 |
| 10$^4$ dPa · s (° C.) | | 1,211 | 1,227 | 1,292 | 1,254 | 1,183 |
| 10$^3$ dPa · s (° C.) | | 1,407 | 1,425 | 1,485 | 1,453 | 1,361 |
| 10$^{2.5}$ dPa · s (° C.) | | 1,530 | 1,549 | 1,604 | 1,578 | 1,475 |
| TL (° C.) | | 1,005 | 1,000 | Unmeasured | 1,020 | 1,110 |
| log$_{10}$ηTL (dPa · s) | | 5.6 | 5.7 | Unmeasured | 5.8 | 4.5 |
| CS (MPa) New KNO$_3$ | | 893 | 820 | 1,084 | 1,020 | 730 |
| DOL (μm) New KNO$_3$ | | 59 | 71 | 58 | 43 | 55 |
| CS (MPa) Old KNO$_3$ | | 807 | 742 | 1,040 | 966 | 687 |
| DOL (μm) Old KNO$_3$ | | 54 | 65 | 53 | 43 | 55 |
| D | | 0.10 | 0.10 | 0.04 | 0.05 | 0.06 |

TABLE 5

| | | Example | | | |
|---|---|---|---|---|---|
| | | No. 21 | No. 22 | No. 23 | No. 24 |
| Glass composition (mol %) | SiO$_2$ | 64.9 | 64.9 | 64.9 | 64.9 |
| | Al$_2$O$_3$ | 11.0 | 11.0 | 13.0 | 9.0 |
| | Na$_2$O | 16.0 | 14.0 | 14.0 | 16.0 |
| | K$_2$O | 2.0 | 4.0 | 2.0 | 4.0 |
| | MgO | 3.0 | 3.0 | 3.0 | 3.0 |
| | ZrO$_2$ | 3.0 | 3.0 | 3.0 | 3.0 |
| | SnO$_2$ | 0.1 | 0.1 | 0.1 | 0.1 |
| MgO/(MgO + CaO) | | 1.0 | 1.0 | 1.0 | 1.0 |
| MgO/(Al$_2$O$_3$ + MgO) | | 0.2 | 0.2 | 0.2 | 0.3 |
| (CaO + SrO + BaO)/MgO | | 0.0 | 0.0 | 0.0 | 0.0 |
| ρ (g/cm$^3$) | | 2.53 | 2.53 | 2.52 | 2.54 |
| α (×10$^{-7}$/° C.) | | 94 | 96 | 87 | 101 |
| Ps (° C.) | | 618 | 617 | 670 | 554 |
| Ta (° C.) | | 671 | 670 | 726 | 601 |
| Ts (° C.) | | 909 | 914 | 973 | 833 |
| 10$^4$ dPa · s (° C.) | | 1,257 | 1,265 | 1,328 | 1,192 |
| 10$^3$ dPa · s (° C.) | | 1,436 | 1,449 | 1,508 | 1,373 |
| 10$^{2.5}$ dPa · s (° C.) | | 1,551 | 1,566 | 1,622 | 1,489 |
| TL (° C.) | | 1,225 | Unmeasured | Unmeasured | 1,070 |
| log$_{10}$ηTL (dPa · s) | | 4.7 | Unmeasured | Unmeasured | 4.9 |
| CS (MPa) New KNO$_3$ | | 1,120 | 1,003 | 1,212 | 785 |
| DOL (μm) New KNO$_3$ | | 52 | 64 | 53 | 58 |
| CS (MPa) Old KNO$_3$ | | 1,029 | 931 | 1,198 | 671 |
| DOL (μm) Old KNO$_3$ | | 52 | 64 | 53 | 54 |
| D | | 0.08 | 0.07 | 0.01 | 0.14 |

Each of the samples in the tables was produced as described below. First, glass raw materials were blended so as to have glass compositions shown in the tables, and melted at 1,580° C. for 8 hours using a platinum pot. Thereafter, the resultant molten glass was cast on a carbon plate and formed into a sheet shape. The resultant glass sheet was evaluated for its various properties.

The density ρ is a value obtained through measurement by a known Archimedes method.

The thermal expansion coefficient α is a value obtained through measurement of an average thermal expansion coefficient in the temperature range of 30 to 380° C. using a dilatometer.

The strain point Ps and the annealing point Ta are values obtained through measurement based on a method of ASTM C336.

The softening point Ts is a value obtained through measurement based on a method of ASTM C338.

The temperatures at the high temperature viscosities of 10$^{4.0}$ dPa·s, 10$^{3.0}$ dPa·s, and 10$^{2.5}$ dPa·s are values obtained through measurement by a platinum sphere pull up method.

The liquidus temperature TL is a value obtained through measurement of a temperature at which crystals of glass are deposited after glass powder that passes through a standard 30-mesh sieve (sieve opening: 500 μm) and remains on a 50-mesh sieve (sieve opening: 300 μm) is placed in a platinum boat and then kept for 24 hours in a gradient heating furnace.

The liquidus viscosity is a value obtained through measurement of a viscosity of glass at the liquidus temperature by a platinum sphere pull up method.

As evident from Tables 1 to 5, each of the samples Nos. 1 to 24 having a density of 2.54 g/cm$^3$ or less and a thermal expansion coefficient of 87 to 107×10$^{-7}$/° C. was found to be suitable as a material for a tempered glass, i.e., a glass to be tempered. Further, each of the samples has a liquidus viscosity of 10$^{4.5}$ dPa·s or more, thus being able to be formed into a sheet shape by a float method, and moreover, has a temperature at 10$^{2.5}$ dPa·s of 1,622° C. or less. This is expected to allow a large number of glass sheets to be produced at low cost with high productivity. Note that the glass compositions of a surface layer of glass before and after tempering treatment are different from each other microscopically, but the glass composition of the whole glass is not substantially changed before and after the tempering treatment.

Subsequently, both surfaces of each of the samples were subjected to optical polishing, and then subjected to ion exchange treatment including immersion in a KNO$_3$ molten salt (fresh $KNO_3$ molten salt) at 440° C. for 6 hours. After completion of the ion exchange treatment, the surface of each of the samples was washed. Then, the stress compression value and thickness of a compression stress layer in the surface were calculated from the number of interference stripes and each interval between the interference fringes, the interference fringes being observed with a surface stress meter (FSM-6000 manufactured by Toshiba Corporation). In the calculation, the refractive index and optical elastic constant of each of the samples were set to 1.52 and 28 [(nm/cm)/MPa], respectively.

The degradation coefficient D of each of the samples was calculated as described below. First, glass having a glass composition including 58.7 mass % of $SiO_2$, 12.8 mass % of $Al_2O_3$, 0.1 mass % of $Li_2O$, 14.0 mass % of $Na_2O$, 6.3 mass % of $K_2O$, 2.0 mass % of MgO, 2.0 mass % of CaO, and 4.1 mass % of $ZrO_2$ was produced. Next, the glass was smashed, and the smashed glass was then subjected to sieving treatment so as to collect glass powder which passed through a sieve having a sieve opening of 300 μm and did not pass through a sieve having a sieve opening of 150 μm, thereby yielding glass powder having an average particle diameter of 225 μm. Next, the glass powder was immersed for 60 hours in 400 ml of $KNO_3$ kept at 440° C. (the basket is shaken up and down 10 times every 24 hours), thereby simulating a degraded $KNO_3$ molten salt. Note that in the degraded $KNO_3$ molten salt produced under this condition, $Na_2O$ was contained at 1,000 ppm (by mol) or more.

In the degraded $KNO_3$ molten salt produced under this condition, each of the samples was immersed at 440° C. for 6 hours to perform ion exchange treatment. After that, the compression stress value and thickness of the compression stress layer in the surface were determined in the same manner as described above. The thus obtained compression stress values (fresh $KNO_3$ molten salt, degraded $KNO_3$ molten salt) were used to calculate the degradation coefficient D=(compression stress value (fresh $KNO_3$ molten salt)—compression stress value (degraded $KNO_3$ molten salt))/compression stress value (fresh $KNO_3$ molten salt).

As evident from Tables 1 to 5, when each of the samples Nos. 1 to 24 was subjected to ion exchange treatment in a fresh $KNO_3$ molten salt, the compression stress value of the compression stress layer in the surface thereof was found to be 730 MPa or more, and the thickness thereof was found to be 43 μm or more. Further, when each of the samples Nos. 1 to 24 was subjected to ion exchange treatment in a degraded $KNO_3$ molten salt, the compression stress value of the compression stress layer in the surface thereof was found to be 625 MPa or more, the thickness thereof was found to be 43 μm or more, and the degradation coefficient D was found to be 0.22 or less.

EXAMPLE 2

Glass raw materials were blended so as to have the glass composition according to the sample No. 1. The resultant glass batch was melted and was then formed into a glass sheet by a float method. Next, the resultant glass sheet was immersed for 6 hours in a $KNO_3$ molten salt (fresh $KNO_3$ molten salt) at 440° C., thus performing ion exchange treatment. Subsequently, the compression stress value and thickness of a compression stress layer in a surface of the glass sheet were calculated from the number of interference fringes and each interval between the interference fringes, the interference fringes being observed with a surface stress meter (FSM-6000 manufactured by Toshiba Corporation). Further, after both surfaces of the glass sheet were polished by 0.2 μm, the compression stress value and thickness of the compression stress layer in each of the surfaces were calculated from the number of interference fringes and each interval between the interference fringes, the interference fringes being observed with the surface stress meter (FSM-6000 manufactured by Toshiba Corporation). After both surfaces of the glass sheet were additionally polished by 10 μm, the compression stress value and thickness of the compression stress layer in each of the surfaces were calculated from the number of interference fringes and each interval between the interference fringes, the interference fringes being observed with the surface stress meter (FSM-6000 manufactured by Toshiba Corporation). In calculation, the refractive index and optical elastic constant of the glass sheet were defined as 1.52 and 28 [(nm/cm)/MPa], respectively. The results of the calculation were as described below. When no surface was polished, the ΔCS value, which was a difference in compression stress value between compression stress layers in the front surface and the back surface, was 40 MPa. When both the surfaces were polished by 0.2 μm, the ΔCS value, which was a difference in compression stress value between compression stress layers in the front surface and the back surface, was 20 MPa. When both the surfaces were polished by 10 μm, the ΔCS value, which was a difference in compression stress value between compression stress layers in the front surface and the back surface, was nil.

EXAMPLE 3

Next, glass raw materials were blended so as to have the glass composition according to the sample No. 1. The resultant glass batch was melted and was then formed into a glass sheet having a thickness of 1 mm by a float method. In this case, the temperature in a tin bath was set so that the temperature in the vicinity of its inlet came to 1,200° C. and the temperature in the vicinity of its outlet came to about 700° C. Subsequently, the glass sheet discharged from the tin bath was caused to pass through the inside of an annealing furnace. The temperature in the annealing furnace was set so that the temperature in the vicinity of its inlet came to about 700° C. and the temperature in the vicinity of its outlet came to about 100° C. Annealing was performed while the temperature was controlled so that temperature distribution in the width direction of the glass sheet was ±2% or less and a temperature difference between the front surface and back surface of the glass sheet in the annealing furnace was ±1% or less. A glass sheet with a size of 1 m by 1 m was cut out from the resultant glass sheet, and the residual stress values of the glass sheet were measured at each position at which virtual grid lines with 10 cm pitch cross to each other and at the vicinities of the outer peripheral portions of its four sides by using a birefringence measuring device ABR-10A manufactured by Uniopt Corporation, Ltd. As a result, the Fmax value, which is the maximum value of the residual stresses of the glass sheet in a planar direction, was found to be 0.25 MPa. Further, after ion exchange treatment was carried out by immersing the glass sheet for 6 hours in a $KNO_3$ molten salt (fresh $KNO_3$ molten salt) at 440° C., the warpage level of the resultant tempered glass sheet was found to be 0.1%. The results reveal that the warpage level of a tempered glass sheet can be reduced by properly controlling the distribution of the residual stresses of a glass to be treated in a planar direction, even when polishing treatment is not carried out. Note that the warpage level of a tempered glass sheet is a value obtained by measuring the straightness per long side dimension by using a laser interferometer.

EXAMPLE 4

Further, glass raw materials were blended so as to have the glass composition according to the sample No. 1. The resultant glass batch was melted and was then formed into a glass sheet having a thickness of 1 mm by a float method. In this case, the temperature in a tin bath was set so that the temperature in the vicinity of its inlet came to 1,200° C. and the temperature in the vicinity of its outlet came to about 700° C. Subsequently, the glass sheet discharged from the tin bath was caused to pass through the inside of an annealing furnace. The temperature in the annealing furnace was set so that the temperature in the vicinity of its inlet came to about 700° C. and the temperature in the vicinity of its outlet came to about 100° C. Annealing was performed while the temperature was controlled so that temperature distribution in the width direction of the glass sheet was ±2% or less and a temperature difference between the front surface and back surface of the glass sheet in the annealing furnace was ±1% or less. Note that "Example 3" and "Example 4" are different in annealing rate. A glass sheet with a size of 1 m by 1 m was cut out from the resultant glass sheet, and the residual stress values of the glass sheet were measured at each position at which virtual grid lines with 10 cm pitch cross to each other and at the vicinities of the outer peripheral portions of its four sides by using a birefringence measuring device ABR-10A manufactured by Uniopt Corporation, Ltd. As a result, the Fmax value, which is the maximum value of the residual stresses of the glass sheet in its planar direction, was found to be 0.80 MPa. Further, after ion exchange treatment was carried out by immersing the glass sheet for 6 hours in a $KNO_3$ molten salt (fresh $KNO_3$ molten salt) at 440° C., the warpage level of the resultant tempered glass sheet was found to be 0.1%. The results reveal that the warpage level of a tempered glass sheet can be reduced by properly controlling the distribution of the residual stresses of a glass to be treated in its planar direction, even when polishing treatment is not carried out. Note that the warpage level of a tempered glass sheet is a value obtained by measuring the straightness per long side dimension by using a laser interferometer.

Here, it is preferred that an $SO_2$ gas be blown to glass at the vicinity of the outlet of the tin bath from above and below the glass so that the glass discharged from the tin bath is not damaged during the subsequent roller conveyance. An $SO_2$ gas has an effect of eluting Na in glass after attaching to the glass. On the other hand, imbalance in the composition of glass between its upper surface and lower surface can result in warpage. Thus, it is preferred that the density of an $SO_2$ gas be the same in the spaces above and below glass and also be the same in the width direction of the glass in each space above and below the glass. Thus, it is preferred that both above and below the glass, a slit-like gas-jetting port extending in its width direction be provided, and immediately behind the gas-jetting port, a slit-like gas-exhausting port extending in its width direction be provided, thus supplying an $SO_2$ gas. The flow rate of the $SO_2$ gas is set to, for example, 1 liter/min.

EXAMPLE 5

Next, glass raw materials were blended so as to have the glass composition according to the sample No. 1. The resultant glass batch was melted and was then formed into a glass sheet having a thickness of 1 mm by a float method. In this case, the temperature in a tin bath was set so that the temperature in the vicinity of its inlet came to 1,200° C. and the temperature in the vicinity of its outlet came to about 700° C. Subsequently, the glass sheet discharged from the tin bath was caused to pass through the inside of an annealing furnace. The temperature in the annealing furnace was set so that the temperature in the vicinity of its inlet came to about 700° C. and the temperature in the vicinity of its outlet came to about 100° C. Annealing was performed while the temperature was controlled so that temperature distribution in the width direction of the glass sheet was ±2% or less and a temperature difference between the front surface and back surface of the glass sheet in the annealing furnace became large (more than ±2% and ±10% or less). When the resultant glass sheet was immersed in $KNO_3$ (fresh $KNO_3$ molten salt) at 440° C. for 6 hours, the resultant tempered glass sheet warped convexly by about 1% in the direction of its top surface (direction of the surface which was not brought into contact with the tin bath). In that case, the compression stress value of the compression stress layer on the top surface side was higher by 15 MPa than that on the bottom surface (surface which was brought into contact with the tin bath) side. Note that the thickness of the compression stress layer in the top surface was the same as that in the bottom surface. Then, an $SiO_2$ film having a thickness of 100 nm was formed by a sputtering method on the top surface side of the resultant glass sheet, and then the whole was immersed in $KNO_3$ (fresh $KNO_3$ molten salt) at 440° C. for 6 hours. As a result, the difference in compression stress value between the top surface and the bottom surface reduced to about 1 MPa or less, and the warpage level also reduced to 0.1%.

INDUSTRIAL APPLICABILITY

The tempered glass and tempered glass sheet of the present invention are suitable for a cover glass of a cellular phone, a digital camera, a PDA, or the like, or a glass substrate for a touch panel display or the like. Further, the tempered glass and tempered glass sheet of the present invention can be expected to find use in applications requiring high mechanical strength, for example, a window glass, a substrate for a magnetic disk, a substrate for a flat panel display, a cover glass for a solar battery, a cover glass for a solid image pick-up element, and tableware, in addition to the above-mentioned applications.

The invention claimed is:
1. A glass sheet to be tempered by being subjected to a tempering treatment, comprising, as a glass composition in terms of mol %,
 50 to 75% of $SiO_2$,
 3 to 13% of $Al_2O_3$,
 0 to 1.5% of $B_2O_3$,
 0 to 4% of $Li_2O$,
 7 to 20% of $Na_2O$,
 0 to 10% of $K_2O$,
 0.5 to 13% of MgO,
 0 to 6% of CaO, and
 0 to 4.5% of SrO,
 wherein the glass sheet is substantially free of $As_2O_3$, $Sb_2O_3$, PbO, and F, and
 wherein the glass sheet has:
  a length of 500 mm or more,
  a width of 500 mm or more,
  a thickness of 1.5 mm or less, and
  an Fmax value of 5 MPa or less, wherein the Fmax value is a maximum value of residual stresses in a planar direction with respect to all planar portions of the glass sheet.
2. The glass sheet to be tempered according to claim 1, wherein the glass sheet comprises, as a glass composition in terms of mol %,

50 to 75% of $SiO_2$,
4 to 13% of $Al_2O_3$,
0 to 1.5% of $B_2O_3$,
0 to 2% of $Li_2O$,
9 to 18% of $Na_2O$,
1 to 8% of $K_2O$,
0.5 to 12% of MgO,
0 to 3.5% of CaO,
0 to 3% of SrO, and
0 to 0.5% of $TiO_2$.

3. The glass sheet to be tempered according to claim 1, wherein the glass sheet comprises, as a glass composition in terms of mol %,
50 to 75% of $SiO_2$,
4 to 12% of $Al_2O_3$,
0 to 1% of $B_2O_3$,
0 to 1% of $Li_2O$,
10 to 17% of $Na_2O$,
2 to 7% of $K_2O$,
1.5 to 12% of MgO,
0 to 3% of CaO,
0 to 1% of SrO, and
0 to 0.5% of $TiO_2$.

4. The glass sheet to be tempered according to claim 1, wherein the glass sheet comprises, as a glass composition in terms of mol %,
55 to 75% of $SiO_2$,
4 to 11% of $Al_2O_3$,
0 to 1% of $B_2O_3$,
0 to 1% of $Li_2O$,
10 to 16% of $Na_2O$,
2 to 7% of $K_2O$,
3 to 12% of MgO,
0 to 3% of CaO,
0 to 1% of SrO,
0.5 to 10% of $ZrO_2$, and
0 to 0.5% of $TiO_2$.

5. The glass sheet to be tempered according to claim 1, wherein the glass sheet comprises, as a glass composition in terms of mol %,
55 to 69% of $SiO_2$,
4 to 11% of $Al_2O_3$,
0 to 1% of $B_2O_3$,
0 to 1% of $Li_2O$,
11 to 16% of $Na_2O$,
2 to 7% of $K_2O$,
3 to 9% of MgO,
0 to 3% of CaO,
0 to 1% of SrO,
1 to 9% of $ZrO_2$, and
0 to 0.1% of $TiO_2$.

6. The glass sheet to be tempered according to claim 1, which has a degradation coefficient D of 0.01 to 0.6.

7. The glass sheet to be tempered according to claim 1, which has a liquidus temperature of 1,075° C. or less.

8. The glass sheet to be tempered according to claim 1, which has a liquidus viscosity of $10^{4.0}$ dPa·s or more.

9. The glass sheet to be tempered according to claim 1, which has a temperature at $10^{4.0}$ dPa·s of 1,250° C. or less.

10. The glass sheet to be tempered according to claim 1, which has a density of 2.6 g/cm³ or less.

11. The glass sheet to be tempered according to claim 1, which has a Young's modulus of 65 GPa or more.

12. The glass sheet to be tempered according to claim 1, which is formed by a float method.

13. A tempered glass sheet, which is formed by performing an ion exchange treatment to the glass sheet to be tempered according to claim 1.

14. The tempered glass sheet according to claim 13, comprising a compression stress layer having a compression stress value of 300 MPa or more and a thickness of 10 μm or more.

15. The tempered glass sheet according to claim 13, which has a surface formed by polishing by 0.5 μm or more in a thickness direction.

16. The tempered glass sheet according to claim 13, which has a ΔCS value of 50 MPa or less, wherein the ΔCS value is a difference in compression stress value between compression stress layers in surfaces opposite to each other.

17. The tempered glass sheet according to claim 13, which has:
a molar ratio $MgO/(MgO+Al_2O_3)$ of 0.05 to 0.30,
a length of 500 mm or more,
a width of 500 mm or more,
a thickness of 0.5 to 1.5 mm,
a Young's modulus of 65 GPa or more,
a compression stress value of a compression stress layer of 200 MPa or more,
a thickness of the compression stress layer of 20 μm or more,
a degradation coefficient D of 0.6 or less, and
a ΔCS value of 50 MPa or less, wherein the ΔCS value is a difference in compression stress value between compression stress layers in surfaces opposite to each other.

18. The tempered glass sheet according to claim 13, which has a compression stress in a surface thereof, wherein the tempered glass sheet comprises, as a glass composition in terms of mol %,
50 to 75% of $SiO_2$,
4 to 12% of $Al_2O_3$,
0 to 1% of $B_2O_3$,
0 to 1% of $Li_2O$,
10 to 17% of $Na_2O$,
0 to 7% of $K_2O$,
1.5 to 12% of MgO,
0 to 3% of CaO,
0 to 1% of SrO, and
0 to 0.5% of $TiO_2$,
wherein the tempered glass has:
a molar ratio $MgO/(MgO+CaO)$ of 0.5 or more,
a molar ratio $MgO/(MgO+Al_2O_3)$ of 0.05 to 0.30,
a length of 500 mm or more,
a width of 500 mm or more,
a thickness of 0.5 to 1.5 mm,
a Young's modulus of 65 GPa or more,
a compression stress value of a compression stress layer of 400 MPa or more,
a thickness of the compression stress layer of 30 μm or more, and
a degradation coefficient D of 0.4 or less.

19. A touch panel display comprising the tempered glass according to claim 13.

20. A cellular phone comprising the tempered glass according to claim 13 as a cover glass.

21. A solar battery comprising the tempered glass according to claim 13 as a cover glass.

22. A display comprising the tempered glass according to claim 13 as a protective member.

* * * * *